April 27, 1948.   G. M. HOLLEY, JR   2,440,371
EMERGENCY PUMP
Filed Feb. 1, 1946

George M. Holley Jr.
INVENTOR.

BY

Patented Apr. 27, 1948

2,440,371

UNITED STATES PATENT OFFICE 2,440,371

EMERGENCY PUMP

George M. Holley, Jr., Grosse Pointe, Mich., assignor to George M. Holley and Earl Holley Application February 1, 1946, Serial No. 644,835

2 Claims. (Cl. 103—11)

In the control of a gas turbine and specifically in the control of a gas turbine as used to drive a plane, a very dangerous situation develops the moment the fuel pump fails. The object of this invention is to provide a pump which is available to step in and act promptly when the primary or normally operating pump fails.

Immediately after the failure of the primary pump, the emergency pump must take its place so that fuel flows to the engine, there being no reserve supply of fuel as in a float chamber.

Figure 1:
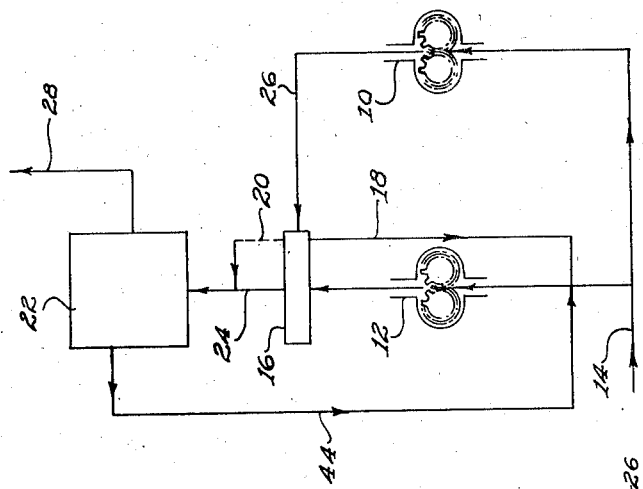
Figure 1 shows diagrammatically the preferred form of my invention.

In Figure 1, 10 is the emergency pump, 12 is the primary pump, 14 is the fuel pipe leading to both pumps, 16 is the selector valve, 18 is the return pipe from the selector valve, which normally bypasses the fuel that the emergency pump supplies. Pipe 20 is connected to a port uncovered by the valve 16 and leads to a chamber 54 which communicates through a pipe 24 which leads to the governor control 22. 26 is the fuel line connecting the pump 10 to the selector valve 16, 20 is the emergency fuel line leading to the governor control 22. 24 is the normal fuel outlet leading from the two fuel pumps 10 and 12 to the governor control 22. 28 is the fuel outlet leading to the gas turbine combustion chamber or to a Diesel engine, which engine also responds directly to fuel flow. The pipe 28 could also supply fluid to any prime mover or to any secondary mover operated by the primary pump.

Figure 2:
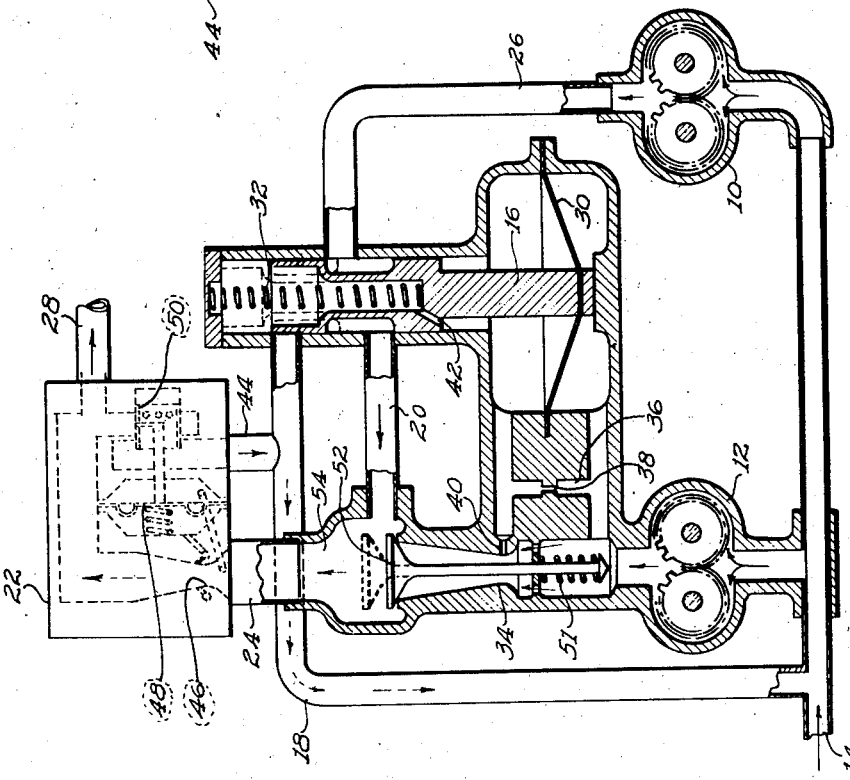
Figure 2 shows more in detail the arrangements of the parts illustrated in the outline of Figure 1.

In Figure 2, as before, 10 is the emergency pump, 12 is the primary pump, 14 is the fuel supply pipe, 16 is the selector valve, 18 is the return line for the emergency pump, 22 is the governor-controlled mechanism, which controls the speed of the engine by returning excess fuel to the supply line 14 through the line 18 and 44.

The selector valve 16 is connected to the diaphragm 30 and is pushed down by the spring 32 and is drawn up by the differential suction in venturi 34; a bypass 36 connects the pressure below the venturi 34 with the throat of the venturi. Restrictions 38 and 40 are provided for obvious reasons. An orifice 42 equalizes the pressure above and below the valve 16. 44 is the return pipe from the governor control 22, which contains a venturi 46 and a diaphragm 48, which controls a balanced valve 50, which regulates the flow to the discharge outlet 28 by returning a portion of the flow through the return pipe 44.

A valve 52 seated in the chamber 54 by a spring 51 closes when the pump 12 quits to prevent a leak back through pump 12.

Operation

When the pumps are normally operating, that is to say, when pump 12 is functioning correctly, there is sufficient flow in the venturi 34 to provide a suction in the throat 40, which suction acts on the diaphragm 39 and the pressure on the diaphragm 30 compresses the compression spring 32. When the compression spring 32 is compressed, the selector valve 16 is raised in the position shown in broken lines. Thereupon, the emergency pump 10 is bypassed through the passage 26, 18 and 14. The fuel merely flows through pipe 26, past the valve 16, down the passage 18. Should the pump 12 fail for any reason, then the compression spring 32 pushes the valve 16 down in the position in which it is shown, because the valve 52 is closed by the compression spring 51 and the discharge from the emergency pump 10 flows by the valve 16 along the passage 20 to the outlet 24. The mechanism shown in the chamber 22 is no part of this invention—merely illustrated to show the practical application of this invention.

What I claim is:

1. An emergency fuel pump having a normally open escape valve in combination with a normally-functioning fuel supply pump having a Venturi outlet, yieldable means for closing said escape valve, means responsive to the drop in pressure in the throat of said Venturi outlet for opening said escape valve against said yielding means when said normally-functioning fuel pump is operating normally, said escape valve being adapted when closed by said yieldable means to also admit fuel from said emergency fuel pump downstream from said Venturi outlet when the flow through said venturi fails, a non-return valve in the outlet from said venturi.

2. A primary fuel pump, an emergency pump, an escape valve for said emergency pump, a diaphragm connected to said escape valve, a restriction in the outlet from said primary pump, means responsive to the drop in pressure at said restriction to open said escape valve whereby the discharge from said emergency pump flows past said escape valve, said escape valve adapted to direct the discharge from said emergency pump into the outlet from said primary pump when said primary pump fails, a non-return valve adjacent to said restriction in the outlet from said primary fuel pump to prevent a reversal of flow through said primary pump from said emergency pump.

GEORGE M. HOLLEY, Jr.

REFERENCES CITED

The following references are of record in the file of this patent:

UNITED STATES PATENTS

| Number | Name | Date |
|---|---|---|
| 1,658,307 | Small | Feb. 7, 1928 |
| 2,243,918 | Parker | June 3, 1941 |
| 2,255,589 | Johnson | Sept. 9, 1941 |
| 2,387,531 | Rose | Oct. 23, 1945 |